D. F. Dunham,
Reading Box.
N° 30,622.   Patented Nov. 13, 1860.
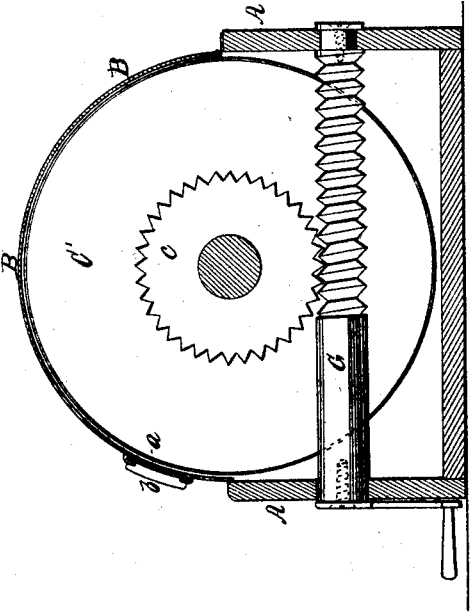
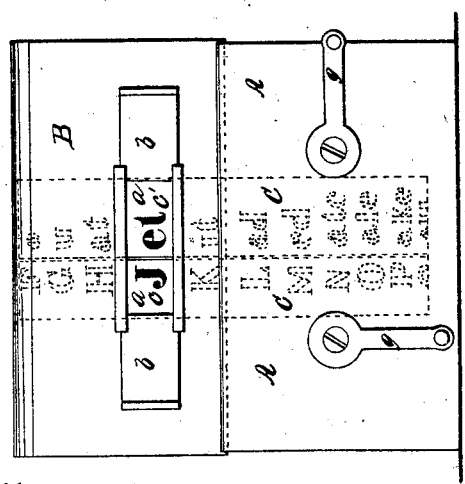
Witnesses.   Inventor.

UNITED STATES PATENT OFFICE.

DAVID F. DUNHAM, OF BROOK, INDIANA.

SPELLING-BOX.

Specification of Letters Patent No. 30,622, dated November 13, 1860.

*To all whom it may concern:*

Be it known that I, DAVID F. DUNHAM, of Brook, in the county of Jasper and State of Indiana, have invented a new and useful Spelling-Box; and I do hereby declare that the following is a full, clear, and exact description thereof, reference being had to the accompanying drawings, making a part of this specification, in which—

Figure 1 is a front view of the spelling box. Fig. 2 is a vertical transverse section through the box, showing the manner of operating the wheels, on which are marked the letters.

Similar letters of reference indicate corresponding parts in both figures.

The object of this invention is to obtain a more perfect and attractive method for teaching children to spell in two three and four letters and syllables, and to arrange the letters in such a manner that almost any combination can be made, forming simple or compound words, and making new words by changing the first or last syllable of the word.

The invention consists in inclosing within a suitable box, having a small opening in one side of its top, two or more wheels or cylinders, each of which having an independent rotary movement of the other; and in covering the peripheries of said wheels with the vowels and consonants, or combinations of vowels and consonants, making a perfect word or an imperfect word, and arranging on the next wheel the alphabet of any language so that by rotating one of the wheels the letters may be grouped together to form words, or parts of words, or simple and compound words, as will be hereinafter explained.

My invention is represented in the annexed drawings, in which A is a box, which may be of any desirable size and proportion, having an arched-shaped top B, on one side of which is a narrow opening *a*, that may be entirely or partially covered by the sliding plates *b, b'*. Within this box are arranged side by side (in this instance) two wheels C, C', each having a hub and a spur wheel *c*, on its outside, which spur wheels engage with the threads of an endless screw shaft G, one of these shafts with its wheel is shown in Fig. 2. The shafts each have a crank handle *g*, on their front ends by which the shafts and consequently the wheels C, C', may be rotated in either direction. The wheels C, C', have printed or engraved on their peripheries the letters of the alphabet, the consonants being printed on the wheel C, and the vowels on the wheel C'. This wheel C', has also printed on it words of two or three letters, which, when brought opposite the consonant letters form new words.

The manner of using this spelling box is as follows:—The wheel C, is turned by means of its handle *g*, until some letter is presented to view, say the letter " J ", as represented in Fig. 1 of the drawings, the wheel C', is then turned until the word " ill " is opposite the " J ", when a new word will be formed; then by continuing the rotation of wheel C', the words " Jake ", " Jed ", and so on, will appear. Then by keeping the word " ill " in sight and turning the wheel with single letters on it, the words " kill ", " mill ", etc., may be formed.

Having thus described my invention, what I claim as new, and desire to secure by Letters Patent, is—

The spelling box with wheels, having letters printed on them, as set forth, constructed as herein described, for the purposes set forth.

DAVID F. DUNHAM.

Witnesses:
  GEO. U. SPITLER,
  W. D. LEE.